Figure 1B:
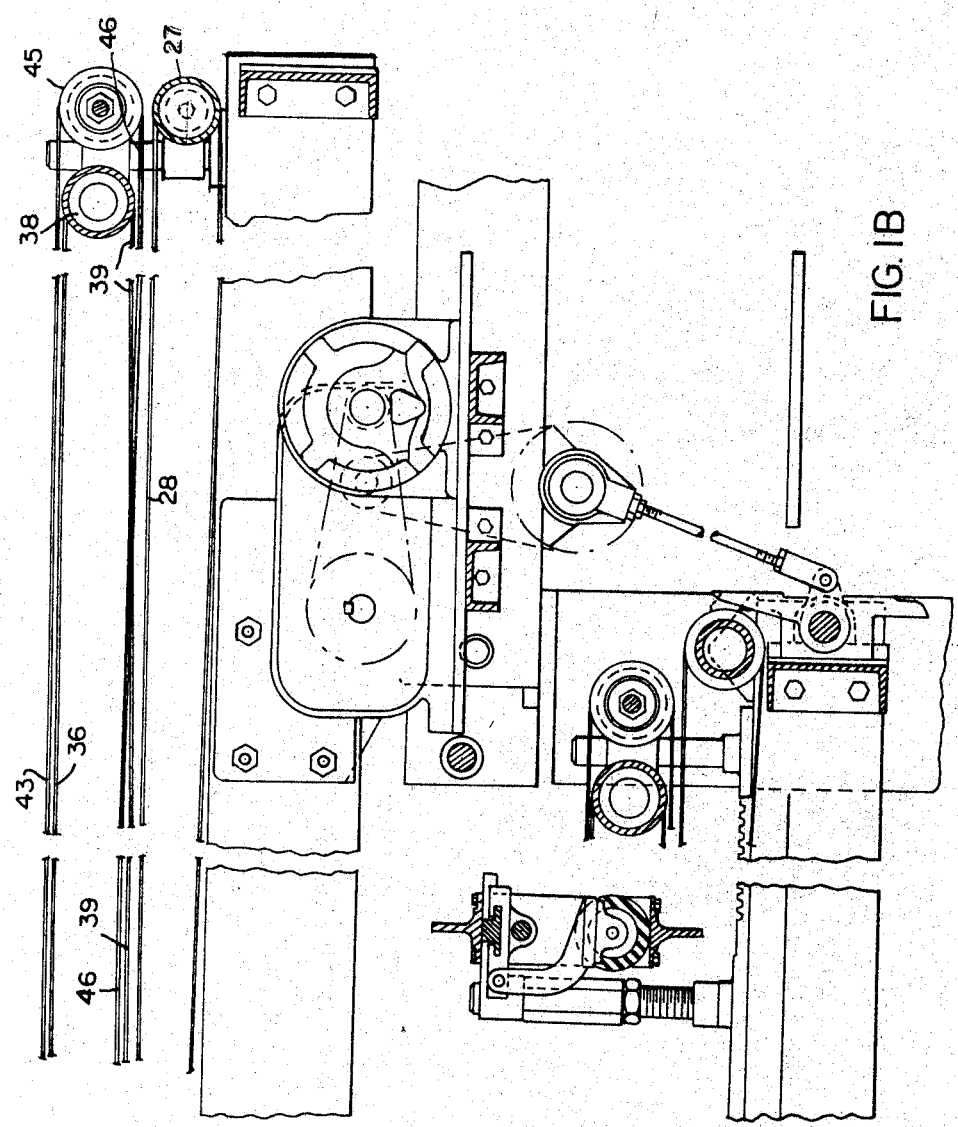

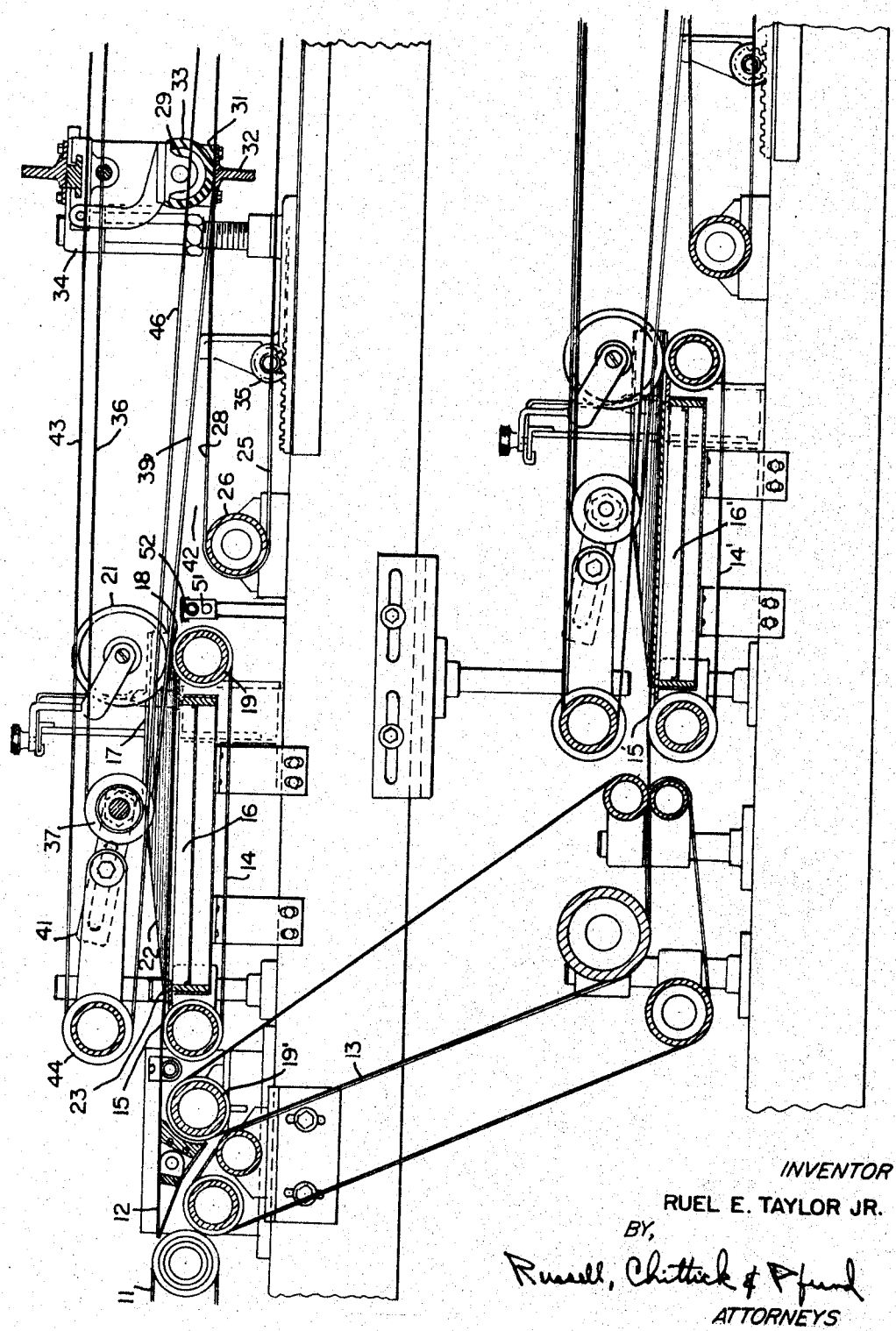

INVENTOR
RUEL E. TAYLOR JR.
BY,
Russell, Chittick & Pfund
ATTORNEYS

May 30, 1967 R. E. TAYLOR, JR 3,322,424
APPARATUS AND METHOD FOR SHEET TRANSPORT AND CONTROL
Filed Jan. 25, 1965 4 Sheets-Sheet 3

INVENTOR
RUEL E. TAYLOR JR.
BY,
Russell, Chittick & Pfund
ATTORNEYS

INVENTOR
RUEL E. TAYLOR JR.
BY,
Russell, Chittick & Pfund
ATTORNEYS

United States Patent Office 3,322,424
Patented May 30, 1967

3,322,424
APPARATUS AND METHOD FOR SHEET TRANSPORT AND CONTROL
Ruel E. Taylor, Jr., South Windham, Maine, assignor to S. D. Warren Company, Boston, Mass., a corporation of Massachusetts
Filed Jan. 25, 1965, Ser. No. 427,663
10 Claims. (Cl. 271—68)

This invention relates generally to flexible sheet transport systems and, more particularly, to improved means for handling non-conductive flexible sheet material at high speed with accurate control of the sheet throughout its path of travel by mechanical arrangements which utilize the dynamic characteristics of the moving sheet and, if required, the introduction of electrical charge stabilization to eliminate the effects of erratic and random charging of the sheet as it moves through the machine under different ambient and dynamic conditions.

The problem of handling flexible sheets of material of large size running through a cutting or sorting regime at high speed becomes more and more acute as the speed increases and this is particularly so for exteremely light weight sheets, such as high quality coated paper and the like. Whenever such materials are handled at high speed, it is almost invariably necessary to employ overlap conveyors to provide a first stage slowdown so that an at rest condition in the pile in the layboy can be accomplished without damaging the head end of the moving sheet as it hits the fixed stop in the layboy. For overlap to be accomplished successfully under the critical operating conditions of high speed for exteremely flexible sheets, the positive control of the head and tail end of the sheet as it goes through the overlap sequence is essential.

When the sheet being processed is of dielectric material, such as paper, which may have a variable moisture content and which may operate in ambients that vary in relative humidity and other factors which can affect the electrical charge accumulation on the paper, a random variable is introduced which can produce erratic results under seemingly similar operating conditions for similar type papers. The electrical charge that is accumulated on the paper sheets is a result of the rotating conveyor tape elements which operate as a static electricity generating device to produce charge which is carried off by the moving paper sheet. The presence of this factor often makes operation erratic due to the significant effect of uncontrolled and uncontrollable variables involved in the generation, distribution, leakage and dissipation of electric charge.

While prior arrangements for overlapping flexible sheets in a high speed conveyor have attempted to provide positive control of both the head and tail end of the sheet by mechanically engaging both ends of the sheet or utilizing vacuum forces to maintain the sheet in contact with a moving conveyor, the present invention utilizes the kinetic energy of the high speed moving sheet itself to transfer the sheet from a high speed condition to an intimate contact with a low speed conveyor with the sheet finally moving at the speed of the low speed conveyor. The work done on the moving high speed sheet in this dynamic operation absorbs the energy of the sheet which is represented by the difference between its high and low speed velocities before and after it is applied to and moves with the low speed conveyor. Thus without resorting to complicated mechanical or vacuum tail catching arrangements, positive control of the sheet is achieved by utilizing the energy of the sheet itself to perform the work on the sheet necessary for the transfer from the high to low speed condition.

A further feature of the invention is the introduction of an intentional electrical charging of the sheets as they pass through the machine which is sufficient to mask the random electric charge effects which are inherent in the operation of such machines thereby permitting the machine to be adjusted for the intentionally introduced charge condition and subsequently achieve a uniformity in the pile in the layboy which is incapable of achievement where randomly charged sheets are received.

Further features of the invention include improved stiffening arrangements for projecting the flexible sheet from the high speed conveyor and dynamic guides and limit boundaries for the traveling sheet to permit the normal undulations and edge flapping which a large flexible sheet traveling at high speed through the air will ordinarily experience without damaging the sheet by hitting a fixed guide or altering its flow characteristics to the extent that high speed operation with a uniform layboy pile cannot be achieved.

Figures 2, 4:
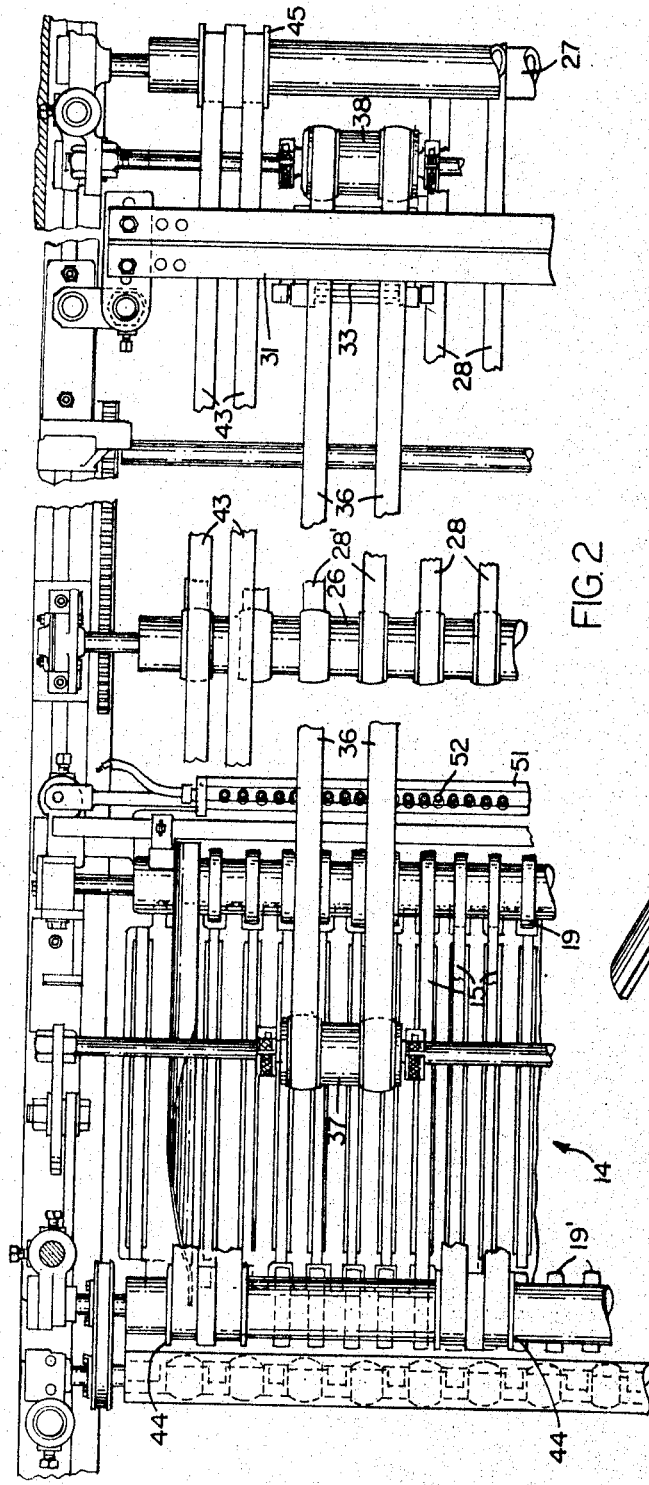
Figure 3A:
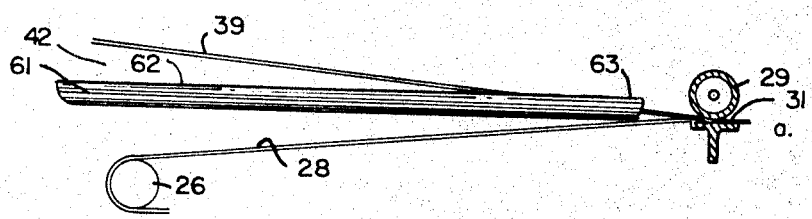
Figure 3B:
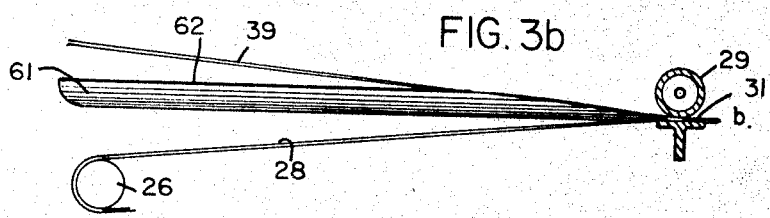
Figure 3C:
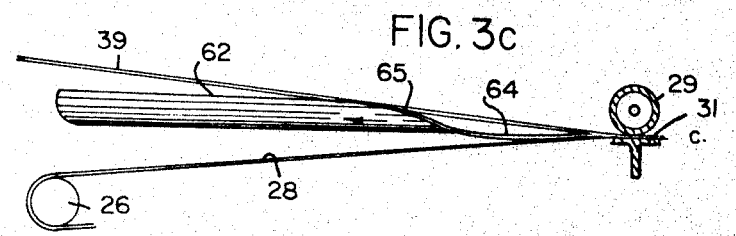
Figure 3D:
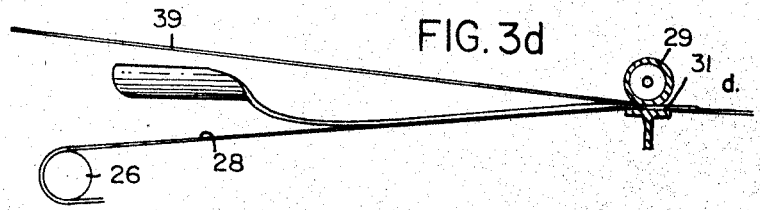
Figure 3E:
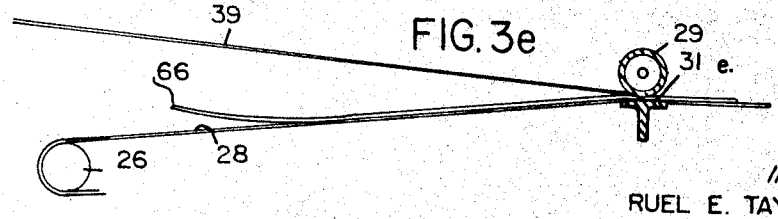

These and other features and objects of the invention will become apparent from the following description and accompanying drawings wherein:

FIGS. 1(a) and 1(b) assembled as indicated show an elevation view of a paper finishing machine incorporating the features of the invention;

FIG. 2 is a plan view of a half portion of the machine shown in FIG. 1 relative to the center line;

FIGS. 3(a)–3(e) are a schematic representation of a portion of the machine shown in FIG. 1 with the progression of a sheet of paper therethrough shown in sequence; and FIG. 4 shows the construction of a curler.

Referring now to FIG. 1, a portion of paper cutting and sorting machine is shown in which cut sheets of any desired length are received from a conveyor 11, located downstream from a cutter, not shown. Sheets arriving on the conveyor 11 pass over a reject gate 12 into a path for acceptable paper sheets without defects therein and defective sheets are deflected downwardly between tapes 13 of the conveyor system for reject sheets by the raising of the reject gate 12 into an upwardly deflected position. Good sheets flow onto a high speed conveyor tape transport 14 which has a top run 15 for conveying the sheets from left to right across the high speed conveyor tape system at a speed slightly greater than the paper feed speed of conveyor 11. Directly beneath the top run tapes 15 is a vacuum box 16 for applying air flow suction between the top tapes 15 for the purpose of corrugating the sheet as it runs across the length of the high speed conveyor. If desired, the top run tapes 15 may converge transversely as they move from left to right for the purpose of facilitating the corrugating action in cooperation with the force applied by the suction box 16 as disclosed in the co-pending application, Ser. No. 235,299, now U.S. Patent No. 3,212,775 of the present inventor.

Reject sheets which are transported by the tapes 13 to a lower position beneath the good paper path are delivered to a high speed transport tape system 14' which has an upper run 15' and a vacuum box 16' all identical with those described for the good paper path. The remaining portions of the path for the reject sheets are in every respect similar to the construction to be described for the good paper path and will not be further described in detail as the description would be merely repetitious. The only significant difference is the overall length of travel for the sheets in each path and this difference in length is merely to permit space for the layboy for receiving sheets from the respective paths to be operated side by side or end to end at the end of the machine and rest on the floor of the mill.

Referring again to the good paper path which passes over the top of the reject gate 12 and across the upper tape run 15 of the high speed conveyor 14, an additional sheet stiffening means is employed for upwardly curling the edges of the paper sheet. For this purpose, opposed semi-circular curling channels 17 extend along the opposite edges of the tape run 15 with a discharge end 18 located beyond the downstream end of conveyor 14 at roll 19. For some conditions of operation, particularly at low speeds, it may be desirable to use idlers 21 on the downstream rollers 19 of conveyor 14 to provide positive control of the sheet until the entire sheet is clear of the tape run 15.

The curlers 17 extend upstream through a smooth transition section 22 to a flat portion 23 tangent to the level of the tape run 15. The flat portions 23 of the curling channels 17 extend inwardly toward the center line of the tape run 15 at a sufficient distance to insure interception of the edge of the sheet passing through the machine. As the sheet progresses beyond the tangent portion 23, the edge will be gradually lifted by the circular contour of the interior of the transition section 22 until in the semi-circular contour of the channel portion 17 the edge of the sheet is lifted through a smooth bend to approximately the vertical position 90 degrees from the flat plane of the tape run 15. This edge stiffening greatly enhances the stiffness of the flexible sheet as it is projected from the nip 19 and by virtue of the curlers extending to the end point 18 maintains the edge curl on the sheet to stiffen the sheet during the arresting operation which is performed in the overlap section hereinafter described.

Beneath and somewhat downstream from the high speed conveyor 14 is a low speed conveyor 25 comprising a set of low speed tapes extending from a driven roller 26 to an idler roller 27. The low speed conveyor 25 has an upper tape run 28 on which the projected sheets from the high speed conveyor 14 are deposited to form an overlapped stream of sheets with the overlap being determined by the relative speeds of the high and low speed conveyors 14 and 25 respectively.

To provide a head catching nip for the head end of sheets projected from the high speed conveyor 14 a set of idler rolls 29 is provided bearing on tapes 39 in contact with tapes 28 which are supported by a flat surface 31 of a T-beam 32 which extends across the width of the machine. The tapes in the upper run 28 of the low speed conveyor 25 pass over the flat surface 31 of the T-beam 32 and those tapes which are aligned within the width of the rollers 29 pass through the nip formed by the surface of the rollers 29 and the surface 31 of the T-beam 32. In this fashion, the rollers 29 are driven by those tapes which pass through the nip formed by the rollers 29 and, accordingly, rollers 29 start and stop and run at the speed of the upper tape run 28.

The rollers 29 are provided with a thick dielectric surface layer 33 which preferably is a silicone rubber such as Dow Corning No. RTV 601 or General Electric Company No. RTV 11. These silicone materials have the properties common to most rubber like dielectrics of generating electric charge when embodied in a rotating machine in which another dielectric, such as the paper sheets and the fabric tapes of tape run 28, run in contact therewith. The silicone rubbers specified produce a very marked charging effect on the paper as it passes through the nip between the roller 29 and the surface 31. Where the accumulation of static electric charge on the sheets has in the past presented a severe problem due to the effect of such charge in the subsequent handling of the sheets and their piling in the layboy, it has been found that the very much augmented charge provided by the silicone rubber surface 33 on the roller 29 permits extremely uniform performance with respect to handling and piling of the sheets beyond the point at which the charge is applied. Thus rather than neutralize the charge to eliminate the adverse effects thereof, this arrangement appears to supply significantly more charge which may be in addition to that normally present or may neutralize that which is present and supply significantly more charge of the opposite polarity, depending upon the polarity of the charge which is inherently on the sheets from previous travel through the machine. In any event, the charging of the sheets by the roller surface 33 greatly facilitates the subsequent handling and piling in the layboy to achieve high speed operation and finished ready to print piling in the layboy without the necessity of edge trimming the pile.

The rollers 29 are supported on an assembly 34 which is adjustably positioned along the flow path of the sheets by means of a rack and pinion engagement 35. By this means the nip between the roller surface 33 and the beam surface 31 can be adjustably located beyond the discharge end 18 of the curlers 17 by approximately the length of the sheets being cut and preferably for long sheets is located an inch or two further from the discharge end 18 than the actual length of the sheets being cut.

Longitudinally aligned with the rollers 29 and extending above both the high speed conveyor 14 and the low speed conveyor 25 is an idling tape run 36 turning about rollers 37 at the upstream end and the rollers 38 at the downstream end thereof. The idler tapes 36 have a bottom run 39 which also pass through the nip formed between roller surface 33 and the beam surface 31 by virtue of which the entire idler tape system 36, including rollers 37 and 38, is driven in synchronism with the low speed conveyor 25. The low speed conveyor 25 preferably has a start-stop control in order to run only when sheets are being fed into the overlap conveyor system, as disclosed in the application of Gilbert Forrester, Ser. No. 95,374, now U.S. Patent No. 3,216,296. With this control system the roller 29 and the idler tape run 36 will start and stop with the starting and stopping of the low speed conveyor 25.

The rollers 37 are rotatably supported on angularly adjustable yokes 41 which are adjustable to maintain the bottom run 39 above the top run 15 of the high speed conveyor 14. By virtue of the location of the surface 31 of T-beam 32 below this level and the fact that the bottom run 39 passes through the nip formed by surface 31, the bottom run between rollers 37 and 29 slants downwardly and with the upwardly slanting top run 28 of the low speed conveyor 25 forms a vertically converging guide 42 to channel the head end of sheets delivered from the high speed conveyor into the nip formed between roller surface 33 and beam surface 31. As can be seen from FIG. 2, due to the lateral position of the idler tapes 36, they are spaced from the curlers 17 and thus do not interfere with the passage of the sheet with curled edges beyond the discharge end 18 of the curlers 17. In the view shown in FIG. 1, a sheet discharging from the curlers 17 would progress into the converging space 42 with the curled edges actually projecting above the bottom tape run 39 of the idler tapes 36.

To provide a dynamic guide and upper limit of travel for sheets which are progressing through the machine, an upper high speed tape run 43 extends from rollers 44 to rollers 45 with the rollers 44 being driven at the speed of high speed conveyor 14. The high speed tapes 43 have a bottom run 46 which does not pass through the nip formed between roller surface 33 and beam surface 31 but is, nevertheless, generally parallel to the bottom run 39 of the idler tapes 36 and remains somewhat above the bottom run 39, thereby providing a dynamic guide and upper limit stop for portions of the sheet which may rise above the level of the bottom run 39. The presence of the high speed bottom run 46 in this location, by providing a limit of travel for sheets in the upward direction, prevents the deflection of sheets which are caught by air currents at high speed and tend to be deflected upwardly by more than acceptable amounts. In the absence of the high speed tape run 46, such sheets could pass beyond control of the slow speed tapes under certain conditions and cause a pile-up of sheets which would necessitate stopping the machine.

Referring now to FIG. 2, the plan view of the machine will be described. Only those portions having to do with the tape transports and guides are shown in FIG. 2 with the directly underlying tapes of a tape transport not visible in FIG. 2. The high speed conveyor 14 provides the top run tapes 15 between a set of collared rollers 19 and 19′. As shown, the top run tapes 15 extend across the full operating width of the machine and comprise a plurality of tapes on the individual collars of the rollers 19 and 19′. At the discharge end of the tape bed 15 just beyond the roller 19 a corona discharge bar 51 having a plurality of point electrodes within concentric outer electrodes 52 extends across the width of the paper path. The electrodes are energized at an alternating potential of 10–15 kilovolts and produce a corona discharge which ionizes the air sufficiently to neutralize the electric charge on the paper at this position of the machine. As indicated in FIG. 2, the idler discs 21 may be omitted, if desired.

As shown in FIG. 2 the high speed tapes 43 pass around roller guides 44, 45 with only two tapes 43 provided in each set of guides. Several pairs of spaced roller guides 44, 45 are provided with two pairs being indicated in FIG. 2. This transverse position for the tapes 43 is selected within a wide range of possible positions but is generally located to control the edges and center of the fast moving sheets and to provide intermediate spaces for the location of the idling tape runs 36. The tape runs 36 each consists of two tapes passing over collared rollers 37 and 38 with the spaced tape runs 36 and its supporting rollers located on each side of the center line of the machine as indicated in FIG. 2. The bottom run tapes 39 of the idler tape runs 36 directly underlie the top run tapes 36 shown in FIG. 2.

The low speed conveyor 25 extending between rollers 26 and 27 comprises a full set of tapes, the top run 28 of which is shown in FIG. 2. The drive roller 26 for the tapes 28 is collared with the collars spaced for the desired spacing of the tapes 28 and the roller 27 is a plain roller at the far end of the machine. As indicated at 28′ at least some of the top run tapes 28 pass beneath the idler rollers 33 thereby driving the rollers 33 and the associated idler tapes 39 of the tape run 36 which pass through the nip formed between the idler rolls 33 and the T-beam surface 31.

Reviewing the various active tapes (i.e. those that contact the paper) which have been shown in FIG. 2, it will be seen that the low speed conveyor top run tapes 28 are the lowest tapes in the diagram. Directly above the tapes 28 is the bottom run 39 of the idler tapes 36 with the bottom run 39 converging at the nip under the rollers 33 and extending to a position more elevated than the top run 15 of the high speed conveyor 14. Thus the converging space 42 is formed with the discharge end of the high speed conveyor tape run 15 projecting sheets into the wide space 42 with the sheets sliding along the slow speed bottom run tapes 39. Directly above the bottom run 39 is the high speed bottom run 46 of the high speed guide tapes 43. As indicated in FIG. 2, the pairs of tapes 43 are spaced transversely in order to provide room for the low speed idler tapes 36 and the rollers 33.

FIG. 4 shows a semi-circular cylinder with a dotted line thereon as an aid to indicate how a cylinder can be cut to form the guide channel 17. If a length of semi-circular cylindrical pipe is cut along the dotted line shown in FIG. 4, the tangential portion 23, the transition 22 and the full semi-circular discharge end 18 will result as shown. This construction can be modified from the exact shape shown but should generally provide the functions of lifting and curling as the head end of the sheet progresses from the tangential portion 23 to the discharge end 18.

Referring now to FIG. 3, a sequence of views designated (a), (b), (c), (d) and (e) shows a paper sheet 61 traveling at high speed into the converging guide space 42 and utimately laid on the top run 28 of the low speed con.-veyor 25. A sheet 61 projected by the high speed conveyor from curlers 17 has upwardly curled edges 62 which stiffens the sheet and causes it to move under its own momentum without buckling. As previously stated, the edges at the head end portion of the sheet, as indicated at 63, may actually be above the level of the bottom run 39 of the idler tapes 36. The portion of the sheet 61 which is actually under the bottom run tapes 39 is constrained, however, to follow the convergence of space 42 so that this portion of the sheet 61 when it arrives at the nip between roller 29 and surface 31 is flat as shown in FIG. 3(b). At this instant, the head end of the sheet is arrested, where the term "arrested" is understood to means having its velocity changed from that of the high speed conveyor 14 to the sheet in FIG. 3(b) which veyor 25. The portions of the sheet in FIG. 3(b) which retain the curled edges 62 are stiff enough to prevent the sheet from collapsing forwardly due to its own momentum. The kinetic energy of the high speed sheet is thus available to institute a transverse wave which starts from the head end of the sheet in the nip under roller 29 and propagates backwardly toward the upstream roller 26 of the low speed conveyor. This deflection propagation is indicated in FIG. 3(c) as having effectively straightened a forward portion 64 of the sheet 61 with an undulation or wave front 65 moving backwardly and progressively straightening the curled edge 62 as the wave front 65 progresses. This wave absorbs the kinetic energy of the high speed portions of the sheet 61 and does the necessary work on the sheet for both slowing it and uncurling the edges thereof until finally, at FIG. 3(e), the tail end 66 is flat in the transverse dimension and laid down with a relatively smart snap upon the top run 28 of the low speed conveyor. This arrangement thus absorbs the necessary energy by using that energy to perform the necessary work on the high speed sheet to reduce it to the low speed conveyor velocity. In so doing, it progressively lays the sheet on the low speed conveyor starting with the head of the sheet at the head catching nip and as each successive portion of the sheet is laid upon the tape run 28, it remains fixed relative thereto and moves with the low speed conveyor tapes 28 to provide an extremely smooth transition from a high velocity sheet to one moving on the low speed conveyor with all the excess kinetic energy of the high speed sheet absorbed in the process.

From the foregoing, the operation of the disclosed apparatus for transporting and overlapping sheets will be clearly understood by those skilled in the art as well as the method by which static electricity in such operations can be brought under control. Various features of the invention can be incorporated individually or in combination to achieve the desired results; and it is accordingly intended that such modifications as fall within the scope of the appended claims should be considered as utilizing the present invention.

I claim:
1. A flexible sheet transport system comprising:
(a) a low speed conveyor,
(b) a high speed conveyor positioned to project sheets over said low speed conveyor to form an overlapped stream of sheets on said low speed conveyor,
(c) roller means in contact with said low speed conveyor and adjustably positioned downstream from the discharge end of said high speed conveyor to provide a head catching nip between said roller means and said low speed conveyor,
(d) a set of tapes above said high and low speed conveyors with a bottom run extending through said nip and running at the speed of said low speed conveyor to provide a converging guide into said nip for the head end of sheets discharged from said high speed conveyor, and
(e) means for imparting a temporary transverse deformation in said sheet to provide longitudinal stiffening of said sheet, said roller means located at a distance from said discharge end approximately equal to the length of said sheet to convert the kinetic energy of said sheet at high speed into a transverse wave propagated from the arrested head end toward the tail end to lay the projected sheet progressively onto the low speed conveyor.

2. Apparatus according to claim 1 and including means for controlling said low speed conveyor to run only when sheets are being fed to the input end of said low speed conveyor, said set of tapes being synchronously driven by contact in said nip with said low speed conveyor.

3. Apparatus according to claim 1 in which said roller means is provided with a surface layer of electric charge generating dielectric for electrically charging the flexible sheets.

4. Apparatus according to claim 1 and including a second set of tapes running at the speed of said high speed conveyor with a bottom run extending above both conveyors and having tapes interspersed with the bottom run of the slow speed set of tapes and outside said nip.

5. Apparatus according to claim 1 in which said means for imparting a temporary transverse deformation in said sheet comprises an opposed pair of curved edge channels for said high speed conveyor with a transition section at the upstream end for guiding the flat edges of said sheet on said high speed conveyor up into curled edges on said sheet as it discharges from said high speed conveyor.

6. Apparatus according to claim 5 in which said high speed conveyor comprises a laterally converging set of tapes with a vacuum suction box thereunder for temporarily corrugating said sheet to further stiffen the sheet as it is projected from said high speed conveyor.

7. Apparatus according to claim 6 and including a second set of tapes running at the speed of said high speed conveyor with a bottom run extending above both conveyors and having tapes interspersed with the bottom run of the slow speed set of tapes and outside said nip.

8. A flexible sheet transport system comprising:
   (a) a low speed conveyor,
   (b) a high speed conveyor positioned to project sheets over said low speed conveyor to form an overlapped stream of sheets on said low speed conveyor,
   (c) roller means in contact with said low speed conveyor and adjustably positioned downstream from the discharge end of said high speed conveyor to provide a head catching nip between said roller means and said low speed conveyor,
   (d) a set of tapes above said high and low speed conveyors with a bottom run extending through said nip and running at the speed of said low speed conveyor to provide a converging guide into said nip for the head end of sheets discharged from said high speed conveyor,
   (e) an opposed pair of curved edge channels for said high speed conveyor with a transition section at the upstream end for guiding the flat edges of said sheet on said high speed conveyor up into curled edges on said sheet as it discharges from said high speed conveyor, and
   (f) said roller means being located at a distance from the discharge end of said channels approximately equal to the length of said sheet to induce a backward traveling transverse wave in said sheet to straighten said sheet and lay it progressively on said low speed conveyor, said rollers having a dielectric outer surface layer for electrically charging said sheet.

9. The method of handling flexible dielectric sheets at high speed for transport to a layboy for stacking in a finished pile comprising the steps of:
   (a) transporting said sheets in succession on endless belt conveyors which produce electrostatic charge effects normally sufficient to influence the handling properties of said sheets;
   (b) passing said sheets under roller means having an electrostatic charge generating dielectric surface in contact with said sheets to charge said sheets to a substantially greater extent than that produced by said conveyors alone;
   (c) transporting said sheets after charging by said roller means on the top surface of a conveyor to an exit point at the end of the conveyor and without actively discharging said sheets subsequent to their passage under said roller means; and
   (d) projecting said sheets substantially horizontally from the end of said conveyor for piling in said layboy.

10. The method according to claim 9 in which said roller has an outer surface layer of silicone rubber.

References Cited
UNITED STATES PATENTS

| 1,545,910 | 7/1925 | Maxon | 271—76 |
| 2,065,503 | 12/1936 | Beck | 271—76 X |
| 2,351,266 | 6/1944 | Hiers | 310—7 |
| 2,576,882 | 11/1951 | Kooles et al. | |
| 2,852,256 | 9/1958 | Faulls et al. | 271—76 |

FOREIGN PATENTS

| 715,013 | 9/1954 | Great Britain. |

M. HENSON WOOD, Jr., *Primary Examiner.*

ALLEN N. KNOWLES, *Examiner.*